US010440654B2

(12) United States Patent
McCoy et al.

(10) Patent No.: US 10,440,654 B2
(45) Date of Patent: *Oct. 8, 2019

(54) CHANNEL SOUNDING TECHNIQUES FOR A WIRELESS COMMUNICATION SYSTEM

(71) Applicant: Apple Inc., Cupertino, CA (US)

(72) Inventors: James W. McCoy, Austin, TX (US); Ning Chen, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/879,697

(22) Filed: Jan. 25, 2018

(65) Prior Publication Data
US 2018/0152896 A1    May 31, 2018

Related U.S. Application Data

(60) Continuation of application No. 14/557,341, filed on Dec. 1, 2014, now Pat. No. 9,883,459, which is a
(Continued)

(51) Int. Cl.
| | |
|---|---|
| *H04B 7/185* | (2006.01) |
| *H04W 52/08* | (2009.01) |
| *H04W 24/10* | (2009.01) |
| *H04B 17/27* | (2015.01) |
| *H04B 17/336* | (2015.01) |
| *H04W 52/36* | (2009.01) |

(52) U.S. Cl.
CPC .......... *H04W 52/08* (2013.01); *H04B 17/27* (2015.01); *H04B 17/336* (2015.01); *H04W 24/10* (2013.01); *H04W 52/367* (2013.01)

(58) Field of Classification Search
CPC ....... H04W 4/00; H04W 72/00; H04W 52/08; H04W 24/10; H04W 52/367; H04B 1/00;
(Continued)

(56) References Cited

U.S. PATENT DOCUMENTS

| | | |
|---|---|---|
| 6,269,092 B1 | 7/2001 | Shilling |
| 7,260,079 B1 | 8/2007 | Chapman et al. |

(Continued)

OTHER PUBLICATIONS

R1-070090, Necessity of Multiple Bandwidths for Sounding Reference Signals, NTT DoCoMo et al., 3GPP TSG RAN WG1 Meeting #47bis, Sorrento, Italy, Jan. 15-19, 2007.
(Continued)

*Primary Examiner* — Hanh N Nguyen
(74) *Attorney, Agent, or Firm* — Meyertons, Hood, Kivlin, Kowert & Goetzel, P.C.

(57) ABSTRACT

A technique of operating a wireless communication system includes determining respective geometries of multiple subscriber stations, which include a first subscriber station and a second subscriber station, with respect to a serving base station. Respective channel sounding bandwidths for sounding the channel between the multiple subscriber stations and the serving base station are then scheduled, based on the respective geometries. The respective channel sounding bandwidths include a first channel sounding bandwidth (associated with the first subscriber station) and a second channel sounding bandwidth (associated with the second subscriber station). The first channel sounding bandwidth is greater than or equal to the second channel sounding bandwidth and the first subscriber station has a lower geometry than the second subscriber station.

20 Claims, 6 Drawing Sheets

Related U.S. Application Data continuation of application No. 12/981,423, filed on Dec. 29, 2010, now Pat. No. 8,903,447, which is a division of application No. 11/742,291, filed on Apr. 30, 2007, now Pat. No. 7,881,721.

(58) Field of Classification Search
CPC ........ H04B 7/00; H04B 7/185; H04B 174/27; H04B 17/336; H04J 3/16
See application file for complete search history.

(56) References Cited

U.S. PATENT DOCUMENTS

| | | | | |
|---|---|---|---|---|
| 8,654,712 | B2* | 2/2014 | Julian | H04L 5/0007 370/329 |
| 8,903,447 | B2* | 12/2014 | McCoy | H04W 24/10 455/522 |
| 9,295,003 | B2* | 3/2016 | Oteri | H04W 52/241 |
| 9,883,459 | B2* | 1/2018 | McCoy | H04W 24/10 |
| 2004/0153679 | A1* | 8/2004 | Fitton | G06F 1/3209 713/322 |
| 2005/0170781 | A1 | 8/2005 | Jacobsen | |
| 2007/0010956 | A1 | 1/2007 | Nerguizian et al. | |
| 2007/0297386 | A1 | 12/2007 | Zhang et al. | |
| 2008/0139236 | A1 | 6/2008 | Barrett | |
| 2008/0232240 | A1 | 9/2008 | Baum et al. | |
| 2008/0268888 | A1 | 10/2008 | Chen et al. | |

OTHER PUBLICATIONS

R1-070653, CDM RS for Demodulation and Channel Sounding, Qualcomm Europe, 3GPP TSG RAN1 #48, St. Louis, Feb. 12-16, 2007.

International Preliminary Report on Patentability, International Patent Application No. PCT/US2008/061265, dated Nov. 3, 2009.

NTT Docomo, et al. "Necessity of Multiple Bandwidths for Sounding Reference Signals," 3GPP Draft; R1-071644 Multibandwidth Sounding RS, 3rd Generation Partnership Project (3GPP), Mobile Competence Centre; 650, Route Des Lucioles; F-06921 Sophia-Antipolis Cedex; France, vol. RAN WG1, No. St. Julian; 20070326-20070330, Apr. 3, 2007 (Apr. 3, 2007), XP050596352 [retrieved on Apr. 3, 2007] paragraphs [001]-[005].

Texas Instruments: "Shared Control Channel Performance with SFTD and Cell Edge Interference Coordination", 3GPP Draft; R1-060066, 3rd Generation Partnership Project (3GPP), Mobile Competence Centre; 650, Routes Des Lucioles; F-06921 Sophia-Antipolis Cedex; France, vol. RAN WG1, No. Helsinki, Finland; 20060123, Jan. 19, 2006 (Jan. 19, 2006), XP050417446 [retrieved on Jan. 191, 2006 paragraphs [001]-[003].

Farooq Kahn Ed-Konrad Hofbauer et af: "Performance of Orthogonal Uplink Multiple Access for Beyond 3G/4G Systems", 2006 IEEE 64th Vehicular Technology Conference: VTC 2006—Fall; Sep. 25-28, 2006, Montreal, Quebec, Canada, Piscataway, NJ: IEEE Operations Center, Sep. 1, 2006 {Sep. 1, 2006), pp. 1-6, XP31051145, ISBN: 978-1-4244-0062-1, paragraph [0011].

Extended European Search Report, EP Application No. 08746649.6, dated Jan. 28, 2013.

Extended European Search Report for European Patent Application No. 17195066.0, dated Feb. 13, 2018, pp. 1-9.

3GPP Draft; Rev-05105, 3RD Generation 1-15 Partnership Project (3GPP), Mobile Competence Centre ; 658, Route Des Lucioles ; F-06921 Sophia-Antipolis Cedex ; France, vol. RAN WGLTE, No. Quebec; 28058607, Jun. 7, 2085 (2885-86-07), XP050189934, 1 page.

* cited by examiner

CHANNEL SOUNDING TECHNIQUES FOR A WIRELESS COMMUNICATION SYSTEM

PRIORITY CLAIM

This application is a continuation of and claims the benefit of priority from U.S. patent application Ser. No. 14/557,341, entitled "Channel Sounding Techniques for a Wireless Communication System", and filed on Dec. 1, 2014, which is a continuation of and claims the benefit of priority from U.S. patent application Ser. No. 12/981,423, entitled "Channel Sounding Techniques for a Wireless Communication System" and filed on Dec. 29, 2010 (issuing as U.S. Pat. No. 8,903,447 on Dec. 2, 2014), which is a divisional of and claims the benefit of priority from U.S. patent application Ser. No. 11/742,291, entitled "Channel Sounding Techniques for a Wireless Communication System" and filed on Apr. 30, 2007 (issued as U.S. Pat. No. 7,881,721 on Feb. 1, 2011), all of which are fully incorporated herein by reference for all purposes and to the extent not inconsistent with this application.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications."

BACKGROUND

Field

This disclosure relates generally to channel sounding and, more specifically, to channel sounding techniques for a wireless communication system.

Related Art

In general, orthogonal frequency division multiplexing (OFDM) systems support high data rate wireless transmission using orthogonal channels, which offer immunity against fading and inter-symbol interference (ISI) without requiring implementation of elaborate equalization techniques. Typically, OFDM systems split data into N streams, which are independently modulated on parallel spaced subcarrier frequencies or tones. The frequency separation between subcarriers is 1/T, where T is the OFDM symbol time duration. Each symbol may include a guard interval (or cyclic prefix) to maintain the orthogonality of the symbols. In general, OFDM systems have utilized an inverse discrete Fourier transform (IDFT) to generate a sampled (or discrete) composite time-domain signal.

Wireless networks have generally used an estimated received signal strength and an estimated carrier to interference and noise ratio (CINR) of a received signal to determine operational characteristics of the networks. As one example, IEEE 802.16e compliant mobile stations (MSs) are required to estimate a received signal strength indicator (RSSI) and a CINR of a received signal. The RSSI associated with a serving BS may be used by an MS for cell re-selection and the CINR, which is reported to the serving BS, may be used by the serving BS to adapt a downlink transmission rate to link conditions.

Accurate reported CINRs are desirable, as inaccurate reported CINRs may impact performance of a wireless network. For example, reporting a CINR that is above an actual CINR may decrease network throughput due to frame re-transmission, while reporting a CINR that is below the actual CINR may cause the serving BS to schedule data rates below a supportable data rate. According to IEEE 802.16e, RSSI and CINR estimates at an MS are derived based on a preamble signal, which is an orthogonal frequency division multiple access (OFDMA) symbol that is transmitted at the beginning of each OFDMA frame.

Similarly, wireless networks that employ third-generation partnership project-long term evolution (3GPP-LTE) compliant architectures are required to employ uplink reference signals (RSs) for uplink CINR estimation, which is used by the network to schedule uplink transmission for user equipment (subscriber stations (SSs)). Respective sequences of the RSs are used to uniquely identify an SS and, when transmitted from the SS to a serving base station (BS), may be used by the serving BS in channel characterization. A known channel sounding (channel characterization) approach has proposed limiting a channel sounding bandwidth of cell-edge SSs, i.e., SSs operating at or near an edge of a cell, to reduce interference with neighboring cells and to improve uplink CINR estimation. In this approach, cell-edge SSs sound a portion of a system bandwidth in one sounding symbol and employ frequency hopping to cover the entire system bandwidth using multiple sounding symbols. Following this approach, non-cell-edge SSs are allowed to sound the entire system bandwidth with a single sounding symbol. Unfortunately, the above-described approach generally increases system bandwidth requirements (due to increased scheduling overhead), results in increased inter-cell interference (due to higher power spectral density (PSD) associated with narrower bandwidths), and does not generally improve channel estimation accuracy.

What is needed are techniques for improving channel sounding in a wireless communication system.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
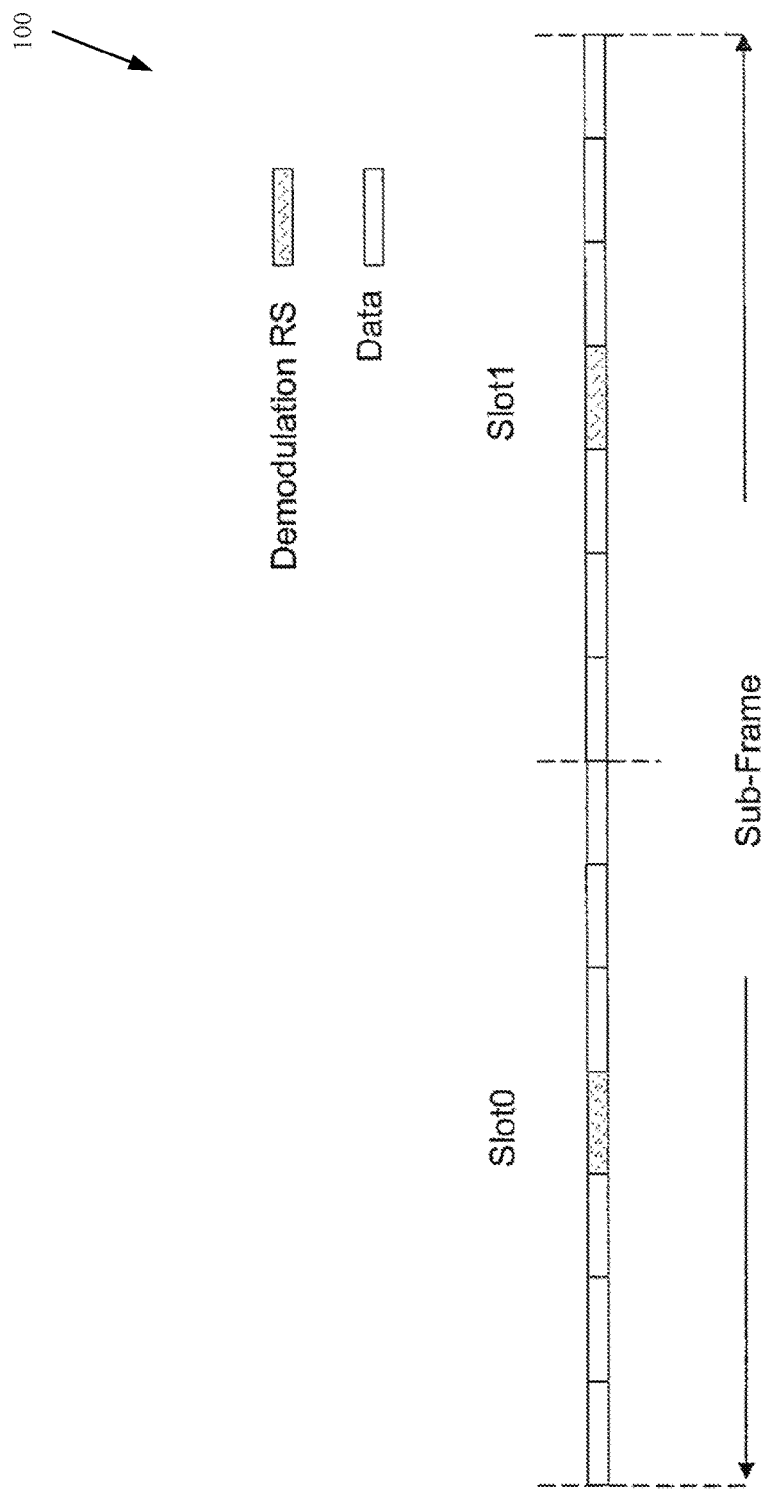
FIG. 1 is a diagram of an example uplink (UL) subframe that includes a demodulation reference signal (RS) positioned in a fourth (middle) symbol of each of two slots.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims and their equivalents. In particular, although the preferred embodiment is described below in conjunction with a subscriber station, such as a cellular handset, it will be appreciated that the present invention is not so limited and may be embodied in various wireless devices, e.g., personal digital assistants (PDAs), digital cameras, portable storage devices, audio players, computer systems, and portable gaming devices, for example.

As is used herein, the term "user equipment" is synonymous with the term "subscriber station," which is used to denote a wireless device associated with a wireless communication system. The term "channel," as used herein, includes one or more subcarriers, which may or may not be adjacent. Moreover, the term "channel" may include an entire system bandwidth or a portion of the entire system bandwidth. As used herein, the term "demodulation RS" means an RS that is assigned to (and transmitted by) an SS, received by a serving base station (BS), and used by the serving BS for channel estimation. According to one aspect of the present disclosure, an uplink (UL) channel sounding bandwidth assignment technique is employed that generally reduces scheduling overhead associated with sounding a UL channel of a wireless communication system. The UL channel sounding technique schedules low-geometry SSs (i.e., SSs with relatively low CINRs) to sound a channel using a channel sounding bandwidth that is greater than or equal to a channel sounding bandwidth of an SS having a higher geometry. The bandwidth for the low-geometry SS may correspond to an entire system bandwidth, e.g., 5 MHz or a portion of the entire system bandwidth, e.g., 2.5 MHz.

To support channel dependent UL scheduling and closed-loop power control, it is desirable to sound an entire system bandwidth. In general, assigning a channel sounding bandwidth to a low-geometry SS that is greater than or equal to a channel sounding bandwidth assigned to a high-geometry SS does not result in increased interference. That is, while a low-geometry SS transmits wider bandwidth sounding reference signals (RSs) at lower power in the frequency-domain, when the sounding RSs are code division multiplexed (CDM) signals, losses in the frequency-domain are gained back in the time-domain. Moreover, when the SS is a cell-edge SS, channel sounding over a wider bandwidth results in less interference in neighboring cells, as the cell-edge SS usually decreases a transmit power level when a bandwidth of a sounding RS is increased. As noted above, conventional channel sounding schemes have proposed limiting a channel sounding bandwidth of a cell-edge SS to less than a channel sounding bandwidth of non-cell-edge SS. A geometry of an SS with respect to a serving BS may be determined by, for example, determining a CINR associated with the SS. For example, power-limited subscriber stations (SSs), e.g., SSs that are at or near a cell-edge, may have a relatively low associated CINR at a serving BS and, thus, be classified as a low-geometry SSs.

One technique for detecting a power-limited SS (e.g., a cell-edge SS) utilizes a feedback indicator, e.g., a 1-bit indicator, from the SS. In this case, the SS determines whether it is power-limited (e.g., transmitting at maximum or near maximum power) and asserts the 1-bit indicator in a UL data or control message to report a power-limited condition to a serving base station (BS). Alternatively, multiple bits may be employed in a feedback indicator to provide an indication of an extent to which an SS is power-limited. Another technique for detecting a power-limited SS may use a carrier to interference and noise ratio (CINR) calculated, by the serving BS, on a received RS. In this approach, the serving BS calculates a CINR of an RS transmitted from a given SS and compares the calculated CINR to a threshold (e.g., 3.5) to determine whether the given SS is power-limited. According to another aspect of the present disclosure, a power-limited SS may be detected by a serving BS that employs a bandwidth provisioning technique. According to the bandwidth provisioning technique, a scheduler assigns a first bandwidth (e.g., one RB) to a given SS. The serving BS then communicates an initial schedule (including an RS) to the given SS and determines a CINR on the RS transmitted by the given SS over the first bandwidth. The scheduler then increases a bandwidth assigned to the SS to a second bandwidth (e.g., two RBs). The serving BS then communicates a new schedule (including a new RS) to the SS and determines a CINR of the new RS transmitted by the given SS over the second bandwidth. The technique may be extended, e.g., to three RBs, four RBs, etc. In general, if the CINR drops at the wider bandwidth(s), a power-limited SS is indicated.

According to one embodiment of the present disclosure, a method of operating a wireless communication system includes determining respective geometries of multiple subscriber stations (which include a first subscriber station and a second subscriber station) with respect to a serving base station. Respective channel sounding bandwidths for sounding the channel between the multiple subscriber stations and the serving base station are then scheduled based on the respective geometries. The respective channel sounding bandwidths include a first channel sounding bandwidth (associated with the first subscriber station) and a second channel sounding bandwidth (associated with the second subscriber station). The first channel sounding bandwidth is greater than or equal to the second channel sounding bandwidth and the first subscriber station has a lower geometry than the second subscriber station.

According to another embodiment of the present disclosure, a method of operating a wireless communication system includes receiving (at a first subscriber station) a power control target, which specifies a target transmit power spectral density level for transmitting a target channel sounding burst from the first subscriber station. The first subscriber station scales the target transmit power spectral density level based on a first channel sounding bandwidth associated with a first channel sounding burst, which is a code division multiplexed (CDM) signal. The first subscriber station then transmits the first channel sounding burst at the scaled target transmit power spectral density level. In this case, due to the fact that the first channel sounding burst is a CDM signal, a serving base station can usually recover the first channel sounding burst (even when the SS is a power-limited cell-edge SS).

According to yet another embodiment of the present disclosure, a wireless communication system includes a base station and a scheduler. The base station is configured to determine respective geometries of multiple subscriber stations with respect to the base station. The scheduler is configured to set respective channel sounding bandwidths for sounding a channel between the multiple subscriber stations and the base station, based on the respective geometries of the multiple subscriber stations. In this embodiment the respective channel sounding bandwidths of lower geometry subscriber stations (included within the multiple subscriber stations) are selected to be greater than or equal to the respective channel sounding bandwidths of higher geometry subscriber stations (included within the multiple subscriber stations).

With reference to FIG. 1, an example uplink (UL) subframe includes a reference signal (RS) positioned in a fourth (middle) symbol of each slot. In the illustrated example, a UL subframe includes two slots, each of which include seven LBs and which each encode a symbol. It should be appreciated that the techniques disclosed herein are broadly applicable to UL subframes that employ more or less than the illustrated number of LBs. In the example UL subframe depicted in FIG. 1, the RS in the middle symbol in each of slots 0 and 1 are demodulation RSs. In general, UL reference signals (RSs) may take various forms, e.g., demodulation RSs and channel sounding RSs. A demodulation RS is associated with transmission of uplink data and/or control signals. In contrast, a channel sounding RS is not usually associated with uplink data transmission. Usually, a demodulation RS is used to estimate a UL channel before decoding data transmitted on the UL channel. In this case, the demodulation RS has the same bandwidth as the data and occupies the same set of subcarriers as the data. UL RSs may be based on Zadoff-Chu (ZC) sequences, which are non-binary unit-amplitude sequences.

Typically, ZC sequences have ideal cyclic autocorrelation and, as such, ZC sequences are constant amplitude zero autocorrelation (CAZAC) sequences. Cyclic shifted versions of a ZC sequence have low cross-correlation, which allows the impact of an interfering signal to be evenly spread in the time-domain, after correlating the received signal with a desired ZC sequence. In general this allows for more reliable detection of a desired channel. According to various embodiments of the present disclosure, channel sounding RSs may be scheduled in any of the LBs in either slot of the UL subframe. According to one or more embodiments, channel sounding symbols scheduled in a same LB of a subframe are configured to be orthogonal when the channel sounding symbols are assigned to a same channel. That is, when multiple SSs are scheduled to transmit channel sounding symbols over the same channel (i.e., group of subcarriers), the scheduled channel sounding symbols for each of the multiple SSs are configured as code division multiplexed (CDM) sequences. The CDM sequences may be generated by cyclic shift of one or more base sequences. In general, a length of the cyclic shift may be based on a typical time delay spread associated with the SSs in a cell. For example, in a wireless communication system having a typical time delay spread of five microseconds and a sampling frequency of 7.68 MHz, a cyclic shift of forty may be employed. The CDM sequences may be, for example, CAZAC sequences, generated in a number of ways. The generation of the CDM sequences is not particularly relevant to the present disclosure and, as such, is not discussed further herein.

As previously noted, to differentiate SSs (and/or cells), multiple unique RSs may be implemented within a wireless communication system. Power-limited SSs may be indicated by SSs that are operating at or near maximum transmitter power (e.g., SSs with a transmitter power of 24 dBm (decibels with respect to one milliwatt)). According to various aspects of the present disclosure, overhead for channel sounding may usually be reduced by determining respective geometries of multiple SSs with respect to a serving BS. Channel sounding bandwidths for sounding a channel with a channel sounding symbol (or symbols) is then set based upon the respective geometries of individual SSs with respect to a serving BS. For example, a channel for a high-geometry SS (e.g., an SS with a CINR of about 15 dB) may be characterized based upon the transmission of channel sounding symbols from the high-geometry SS over a channel sounding bandwidth of one resource block (e.g., twelve subcarriers). As another example, a channel for a low-geometry SS (e.g., an SS with a CINR of about 0 dB) may be characterized based upon the transmission of a channel sounding symbol from the low-geometry SS over a channel sounding bandwidth of four resource blocks (e.g., forty-eight subcarriers). As yet another example, a channel for a medium-geometry SS (e.g., an SS with a CINR of about 7.5 dB) may be characterized based upon the transmission of channel sounding symbols from the medium-geometry SS over a channel sounding bandwidth of two resource blocks (e.g., twenty-four subcarriers). In this example, it should be appreciated that the high-geometry and medium-geometry SSs are required to frequency hop to sound the channel covered by the low-geometry SS in one sounding symbol. It should also be understood that the CINRs, set forth above, are example CINRs.

In general, a length of an RS ($r_u(n)$) is determined by a length of a discrete Fourier transform (DFT), e.g., a fast Fourier transform (FFT), that is used for the RS (i.e., the number of subcarriers employed). For example, when an RS is assigned one resource block (i.e., twelve subcarriers in the frequency-domain), eleven basis sequences may be generated using a cyclic extension approach, i.e., $r_u(n)$, $0 \leq u \leq 10$, $0 \leq n \leq NFFT-1$, where NFFT is the size of the DFT. From each basis, twelve orthogonal sequences may be generated using a cyclic shift in the frequency-domain. An uplink transmitter of an SS may implement one of a phase shift keying (PSK), a quadrature amplitude modulation (QAM), or other data modulation scheme, depending upon which modulation scheme is scheduled. It should be appreciated that any of the various PSK, e.g., pi/2 BPSK, QPSK and 8-PSK, or QAM, e.g., 16-QAM and 64-QAM, modulation techniques may be implemented in a wireless communication system constructed according to the present disclosure.

According to one or more embodiments of the present disclosure, a serving BS initially calculates a CINR of a training signal transmitted from a given SS, during a training sequence, and compares the calculated CINR to one or more thresholds to determine a geometry of the given SS. The training signal may be, for example, a random access preamble or a channel sounding burst. In the event that the given SS is determined to be a low-geometry SS, a channel sounding RS having a relatively wide bandwidth may be assigned, by a scheduler (e.g., a network scheduler), to the SS. In the event that the SS is later detected to be at a higher geometry, the scheduler may assign a different channel sounding RS, having a narrower bandwidth, to the SS. It should be appreciated that the time period over which an SS is scheduled to transmit the channel sounding RS should generally be less than a coherence time of the UL channel (i.e., a time over which the UL channel is stable). Moreover, a bandwidth assigned to the channel sounding RS should include enough subcarriers such that code division multiplexing (CDM) can be employed for the channel sounding RSs transmitted by the SSs (for example, twelve subcarriers are typically required to implement CDM for the UL channel). The channel sounding symbols transmitted by the different SSs should usually be orthogonal, such that multiple SSs can transmit channel sounding RSs simultaneously over the same channel (group of subcarriers) without interference. A serving BS can then receive the respective channel sounding RSs transmitted by respective SSs and accurately determine channel characteristics based on the received channel sounding RSs.

For power-limited SSs (e.g., cell-edge SSs that are transmitting at a power level of about 24 dBm) that are farther from the serving BS, a channel sounding bandwidth of a channel sounding symbol may be assigned a relatively wide bandwidth, e.g., an entire system bandwidth. Moreover, the sounding RSs may be utilized in conjunction with demodulation RSs to improve accuracy of CINR calculations for the SSs. For example, when a channel sounding RS occupies a same channel as a demodulation RS, CINRs associated with the demodulation and sounding RSs may be averaged to provide a better indication of channel quality. To improve noise and interference estimates, one or more blank cyclic shifts may be employed. That is, certain of the CDM sequences (blank cyclic shifts) may not be assigned to an SS. In this manner, a serving BS may estimate noise and interference based on decoded blank cyclic shift(s).

Figure 2:
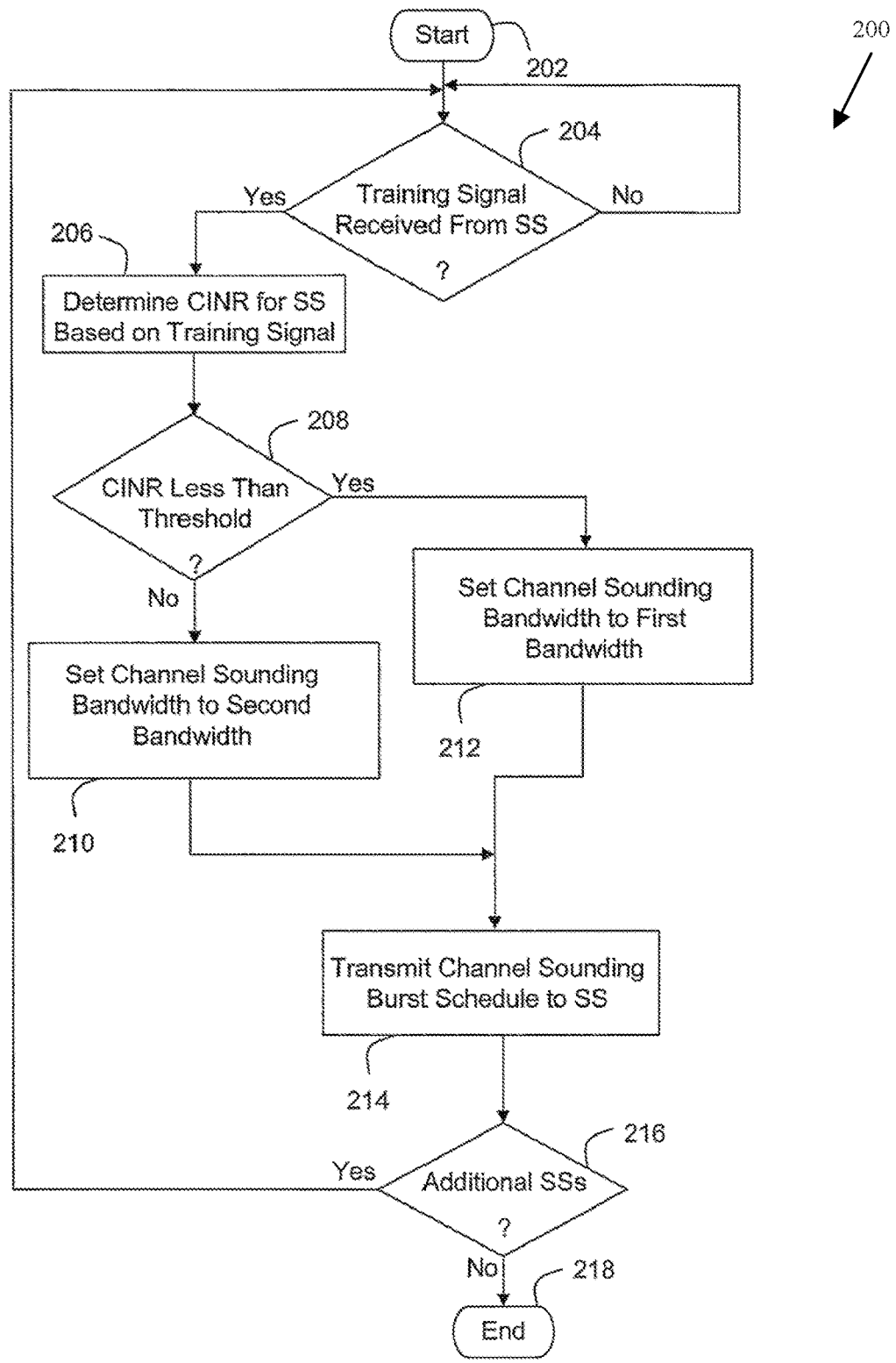
FIG. 2 is a flowchart of a channel sounding bandwidth assignment process that may be, at least partially, employed in a scheduler of a wireless communication system, according to the present disclosure.

Turning to FIG. 2, a process 200 for assigning channel sounding bandwidths to SSs is depicted. The process 200 may be predominantly employed in a scheduler, e.g., a network-based scheduler, of a wireless communication system. The process 200 is initiated at block 202, at which point control transfers to decision block 204. In block 204, the serving base station (BS) determines whether a training signal has been received from an SS. If a training signal is received in block 204, control transfers to block 206, where a CINR for the SS is determined based on the training signal. If a training signal is not received in block 204, control loops on block 204 until a training signal is received. Following block 206, control transfers to decision block 208 where it is determined, e.g. by a scheduler, whether the CINR is less than a threshold. If the CINR of the SS is less than a threshold, control transfers to block 212, where a channel sounding bandwidth for the SS is set to a first bandwidth. If the CINR of an SS is not less than a threshold, control transfers from block 208 to block 210, where a channel sounding bandwidth is set to a second bandwidth, which is less than or equal to the first bandwidth. Following blocks 210 and 212, control transfers to block 214. In block 214, the serving BS transmits the channel sounding burst schedule to the SS. Next, in decision block 216, the serving BS determines whether additional SSs require training. If so control transfers to block 204. Otherwise, control transfers from block 216 to block 218, where control returns to a calling routine.

A CINR of a received signal may be estimated through a number of approaches. As a first example, U.S. Patent Application Publication No. 2006/0133260 discloses a channel estimation based approach for estimating CINR that isolates noise and interference components using pilot sequences and estimates a channel power by subtracting a combined noise and interference power estimate from a received power estimate. As a second example, U.S. Patent Application Publication No. 2006/0093074 discloses a difference based approach for estimating CINR that assumes that adjacent pilot locations have the same subchannel characteristics. In view of this assumption, noise and interference components are isolated by subtracting adjacent received signals.

Figure 3:
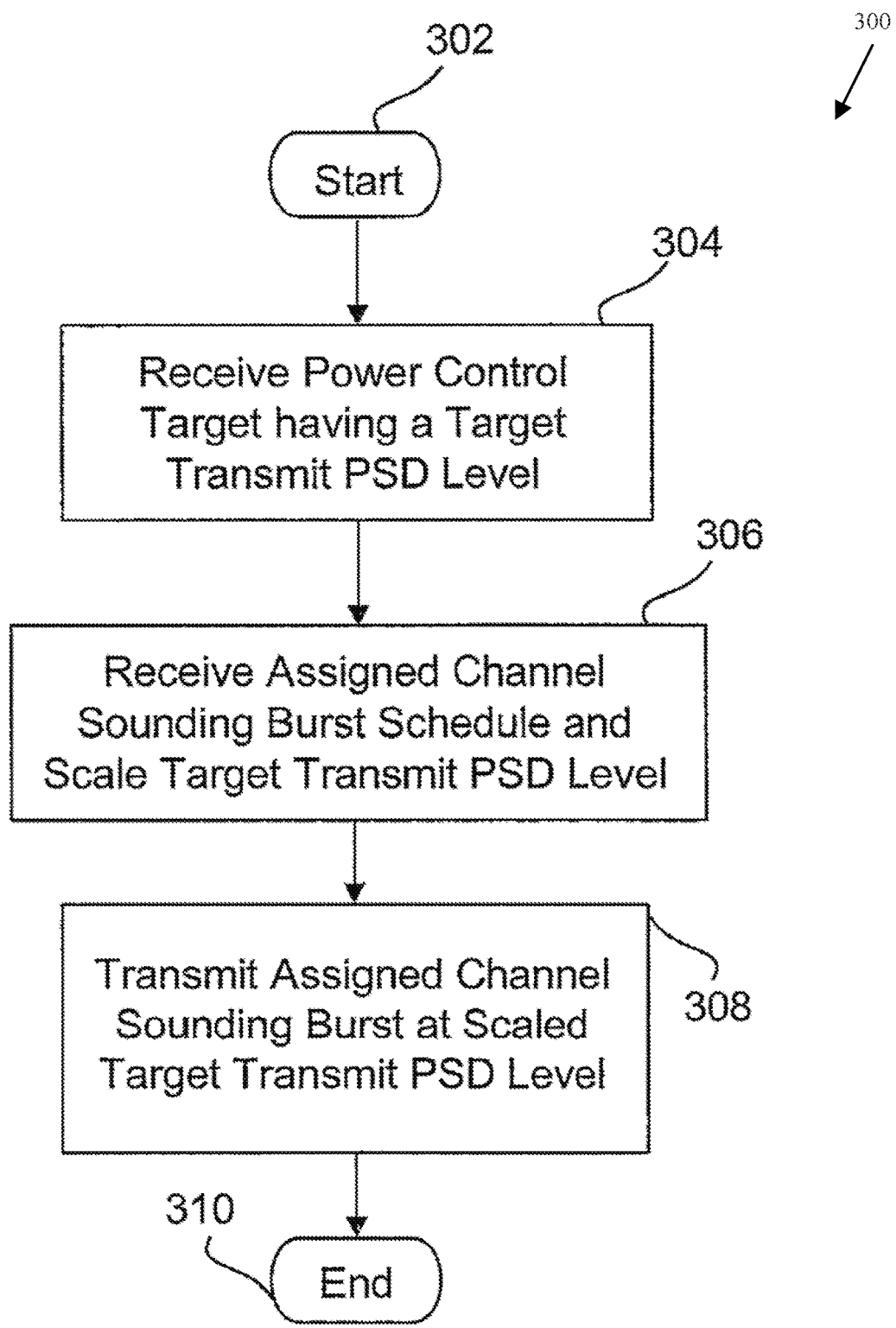
FIG. 3 is a flowchart of a process for receiving/transmitting an assigned channel sounding burst (at a scaled target transmit power spectral density level) at/from a subscriber station (SS), according to the present disclosure.

Moving to FIG. 3, a process 300, for receiving a power control target (having an associated target transmit power spectral density level, which has an associated bandwidth) and an assigned channel sounding burst schedule and transmitting an assigned channel sounding burst at a scaled target transmit power spectral density level, is illustrated. In block 302, the process 300 is initiated, at which point control transfers to block 304. In block 304, the power control target is received. Next, in block 306, an assigned channel sounding burst schedule is received and the associated target transmit power spectral density level is scaled (based on a channel sounding bandwidth associated with an assigned channel sounding burst) at an SS. The power control target may be, for example, periodically broadcast from a serving BS on a common control channel (CCH).

Scaling of the target transmit power spectral density level facilitates the transmission of sounding RSs that have different bandwidths. For example, assuming that the associated bandwidth of the power control target corresponds to four resource blocks (e.g., forty-eight subcarriers) and an assigned channel sounding burst has an associated bandwidth of two resource blocks (e.g., twenty-four subcarriers), then the scaled target transmit power spectral density level would be 3 dB above the target transmit power spectral density level indicated by the power control target. As another example, assuming that the associated bandwidth of the power control target correspond to four resource blocks (e.g., forty-eight subcarriers) and an assigned channel sounding burst has an associated bandwidth of eight resource blocks (e.g., ninety-six subcarriers), then the scaled target transmit power spectral density level would be 3 dB below the target transmit power spectral density level of the power control target. Next, in block 308, the assigned channel sounding burst is transmitted by the SS at the scaled target transmit power spectral density level. Following block 308, control transfers to block 310, where control returns to a calling routine.

Figure 4:
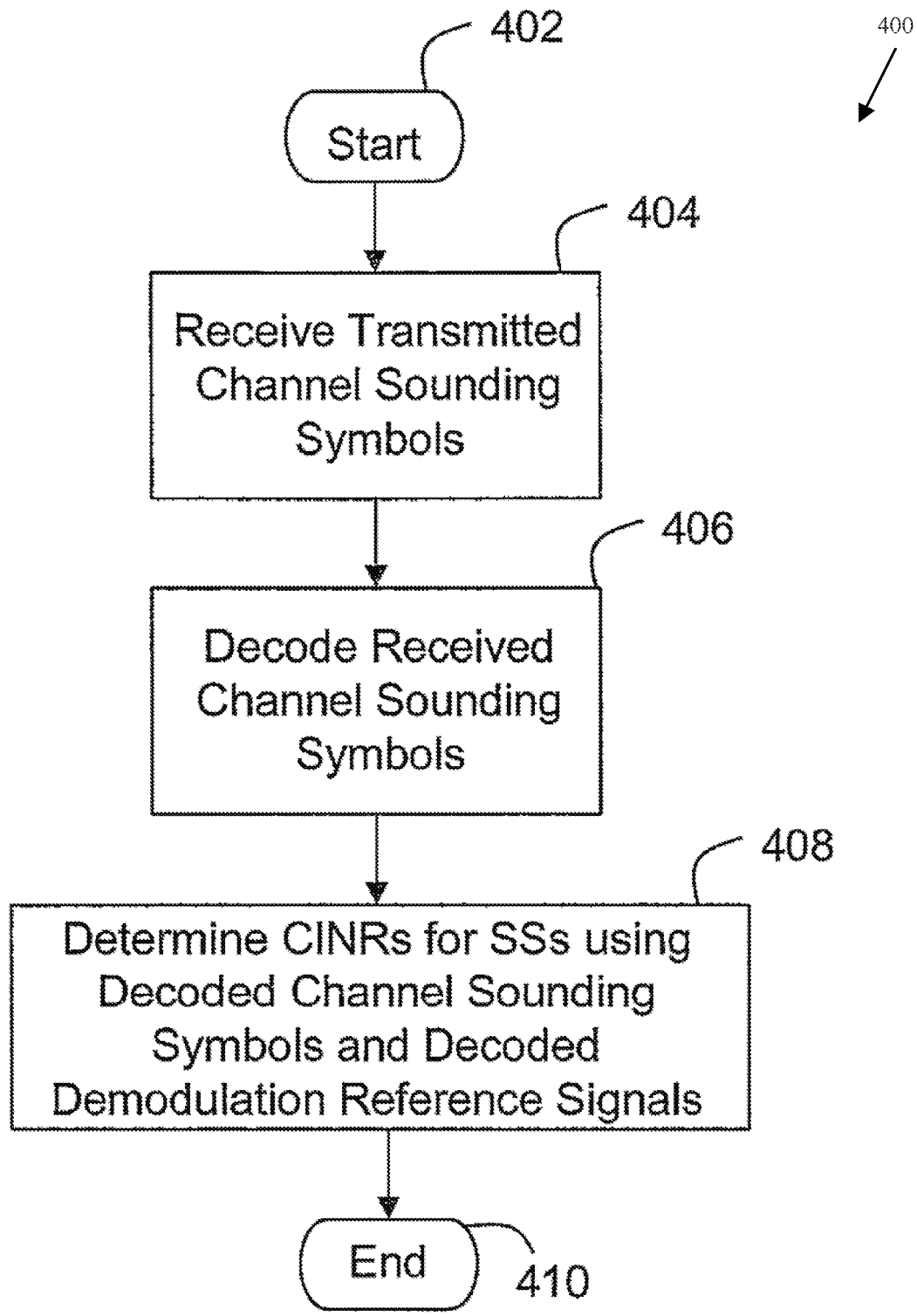
FIG. 4 is a flowchart of a carrier to interference and noise ratio (CINR) determination process that may be employed in base stations (BSs) of a wireless communication system, according to another embodiment of the present disclosure.

Turning to FIG. 4, a CINR determination process 400, that may be employed in a serving BS of a wireless communication system, is depicted. The process 400 may be utilized to determine a CINR of a training signal (or a non-training signal) and is initiated at block 402, at which point control transfers to block 404. In block 404, the serving BS receives transmitted channel sounding symbols from multiple SSs. Next, in block 406, the received channel sounding symbols are decoded. Then, in block 408, CINRs are determined for the SSs using the decoded channel sounding symbols and, for example, one or more blank cyclic shifts. As noted above, a blank cyclic shift is a sequence that was not assigned to an SS for transmission. The blank cyclic shift allows the serving BS to make a determination of the interference and noise (I+N) level on a channel. In general, the interference may be attributed to SSs in adjacent cells and the noise is white noise (e.g., thermal noise) attributable to a receiver of the serving BS. The CINR determined from the decoded sounding RS(s) for an SS may be combined with a CINR determined from a decoded demodulation RS(s) for the SS. For example, CINRs associated with demodulation and sounding RSs may be averaged to provide a better indication of channel quality. As another example, CINRs associated with demodulation and sounding RSs may be weighted and averaged to provide a better indication of channel quality. In this manner, the CINRs may be utilized to improve channel estimation for data demodulation. Next, in block 410, control returns to a calling routine.

Figure 5:
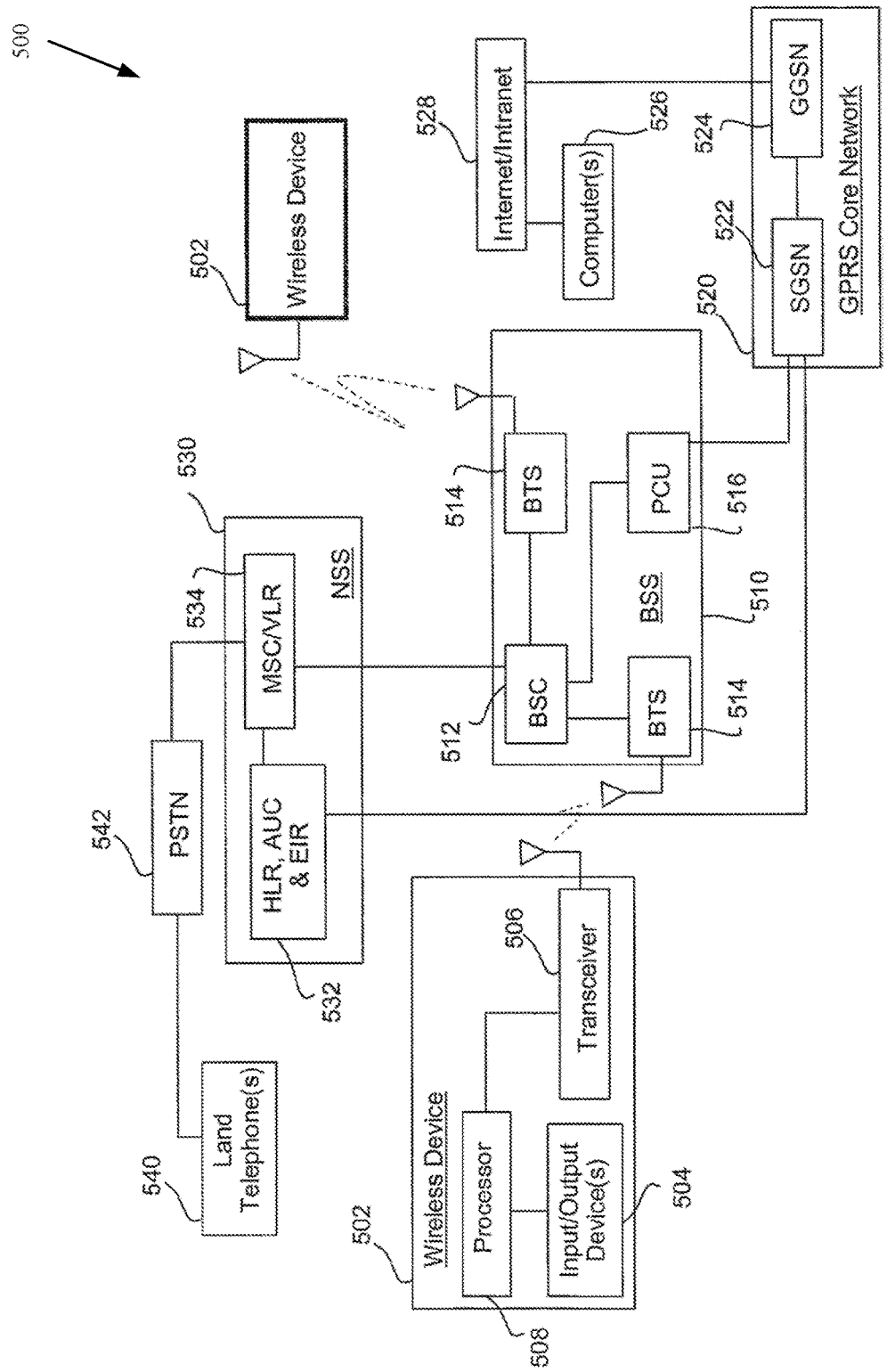
FIG. 5 is a block diagram of an example wireless communication system that may assign channel sounding bandwidths to SSs according to various embodiments of the present disclosure.

With reference to FIG. 5, an example wireless communication system 500 is depicted that includes a plurality of wireless devices (subscriber stations) 502, e.g., hand-held computers, personal digital assistants (PDAs), cellular telephones, etc., that may implement channel sounding according to one or more embodiments of the present disclosure. In general, the wireless devices 502 include a processor 508 (e.g., a digital signal processor (DSP)), a transceiver 506, and one or more input/output devices 504 (e.g., a camera, a keypad, display, etc.), among other components not shown in FIG. 5. As is noted above, according to various embodiments of the present disclosure, techniques are disclosed that generally improve channel sounding for a wireless communication device, such as the wireless devices 502. The wireless devices 502 communicate with a base station controller (BSC) 512 of a base station subsystem (BSS) 510, via one or more base transceiver stations (BTS) 514, to receive or transmit voice, data, or both voice and data. The BSC 512 may, for example, be configured to schedule communications for the wireless devices 502.

The BSC 512 is also in communication with a packet control unit (PCU) 516, which is in communication with a serving general packet radio service (GPRS) support node (SGSN) 522. The SGSN 522 is in communication with a gateway GPRS support node (GGSN) 524, both of which are included within a GPRS core network 520. The GGSN 524 provides access to computer(s) 526 coupled to Internet/intranet 528. In this manner, the wireless devices 502 may receive data from and/or transmit data to computers coupled to the Internet/intranet 528. For example, when the devices 502 include a camera, images may be transferred to a computer 526 coupled to the Internet/intranet 528 or to another one of the devices 502. The BSC 512 is also in communication with a mobile switching center/visitor location register (MSC/VLR) 534, which is in communication with a home location register (HLR), an authentication center (AUC), and an equipment identity register (EIR) 532. In a typical implementation, the MSC/VLR 534 and the HLR, AUC, and EIR 532 are located within a network and switching subsystem (NSS) 530, which may also perform scheduling for the system 500. The SGSN 522 may communicate directly with the HLR, AUC and EIR 532. As is also shown, the MSC/VLR 534 is in communication with a public switched telephone network (PSTN) 542, which facilitates communication between wireless devices 502 and land telephones 540. It should be appreciated that other types of wireless systems, having different configurations, may implement various aspects of the channel sounding techniques disclosed herein.

Figure 6:
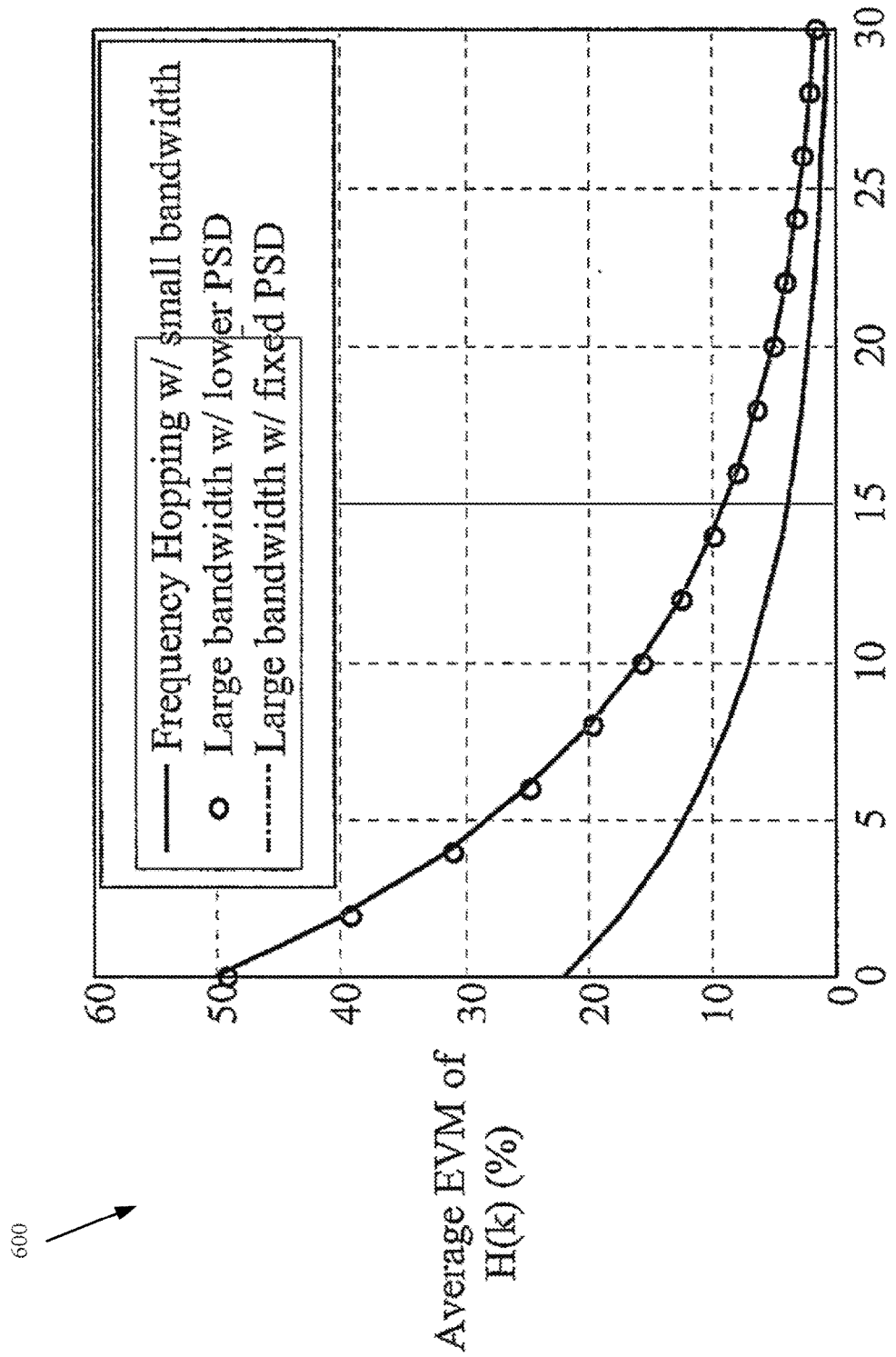
FIG. 6 is an example graph that provides a comparison of error performance of a wireless communication system that performs conventional channel sounding with a wireless communication system that performs channel sounding according to various embodiments of the present disclosure.

Turning to FIG. 6, an example graph provides simulated error performance of a wireless communication system that employs conventional channel sounding (i.e., frequency hopping) with that of wireless communication systems that employ channel sounding according to various embodiments of the present disclosure. The graph plots average error vector magnitude (EVM) of CINR estimation versus signal-to-noise ratio (SNR) for three SSs (i.e., a low-geometry SS that sounds an entire system bandwidth in one channel sounding symbol (large bandwidth w/lower PSD); a frequency hopping low-geometry SS that sounds the entire system bandwidth over five sounding symbols (frequency hopping w/small bandwidth); and a non-power limited low-geometry SS that sounds the entire system bandwidth in one channel sounding symbol (large bandwidth w/fixed PSD)). As is illustrated, there is essentially no channel estimation degradation attributable to wideband channel sounding according to the present disclosure. This is true even for the case where a sounding bandwidth is such that power spectral density (PSD) indicates that a low-geometry SS is power-limited (i.e., large bandwidth w/lower PSD). As is also illustrated, for a non-power limited SS (large bandwidth w/fixed PSD) the simulated error performance is significantly improved over the prior art (frequency hopping w/small bandwidth).

As mentioned above, when a power limited SS, e.g., a cell-edge SS, sounds a larger bandwidth with a lower PSD, interference in neighboring cells is reduced as the power of the sounding RS power is spread over a larger bandwidth. On the other hand, in the case of frequency hopping, when the cross-correlation between Zadoff-Chu (ZC) sequences with different lengths is high, interference in neighboring cells is increased. Moreover, frequency hopping of sounding RSs does not increase the accuracy of channel state information (CSI) measurement. For example, a wireless communication with a system bandwidth of 5 MHz may utilize 25 data resource blocks (RBs). In the frequency hopping case, a sounding RS may sound 5 RBs at a time. When an SS is power-limited, sounding an entire system bandwidth (25 RBs) provides a sounding RS that has a 7 dB lower PSD than the frequency hopping sounding RS (5 RBs). In the simulation results depicted in FIG. 6, the average EVM of the frequency response of the channel was used as the CSI estimate accuracy indicator. In the simulation, the frequency response was measured over the smaller bandwidth occupied by the frequency hopping sounding RS, which is a setting that favors frequency hopping. As is illustrated in FIG. 6, even when the entire system bandwidth sounding RS has a 7 dB lower PSD than the frequency hopping sounding RS, essentially the same CSI estimation accuracy is achieved. This response is attributable to the fact that entire system bandwidth sounding RS has a higher spreading gain (7 dB), which compensates for the 7 dB loss in signal strength. The 7 dB spreading gain is readily observable when an SS is not power-limited (large bandwidth w/fixed PSD). Accordingly, a number of techniques have been disclosed herein that generally improve channel sounding in a wireless communication system.

As used herein, a software system can include one or more objects, agents, threads, subroutines, separate software applications, two or more lines of code or other suitable software structures operating in one or more separate software applications, on one or more different processors, or other suitable software architectures.

As will be appreciated, the processes in preferred embodiments of the present invention may be implemented using any combination of computer programming software, firmware or hardware. As a preparatory step to practicing the invention in software, the computer programming code (whether software or firmware) according to a preferred embodiment will typically be stored in one or more machine readable storage mediums such as fixed (hard) drives, diskettes, optical disks, magnetic tape, semiconductor memories such as read-only memories (ROMs), programmable ROMs (PROMs), etc., thereby making an article of manufacture in accordance with the invention. The article of containing the computer programming code is used by either executing the code directly from the storage device, by copying the code from the storage device into another storage device such as a hard disk, random access memory (RAM), etc., or by transmitting the code for remote execution. The method form of the invention may be practiced by combining one or more machine-readable storage devices containing the code according to the present disclosure with appropriate standard computer hardware to execute the code contained therein. An apparatus for practicing the techniques of the present disclosure could be one or more computers and storage systems containing or having network access to computer program(s) coded in accordance with the present disclosure.

Although the invention is described herein with reference to specific embodiments, various modifications and changes can be made without departing from the scope of the present invention as set forth in the claims below. For example, the channel sounding techniques disclosed herein are generally broadly applicable to wireless communication systems. Accordingly, the specification and figures are to be regarded in an illustrative rather than a restrictive sense, and all such modifications are intended to be included with the scope of the present invention. Any benefits, advantages, or solution to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of operating a subscriber station, comprising:
    at the subscriber station:
        receiving a power control target, wherein the power control target corresponds to a first transmit power spectral density level for transmitting a first channel sounding burst having first channel sounding bandwidth;
        determining a second power spectral density level by scaling the first power control target based on a second channel sounding bandwidth for a second channel sounding burst, wherein the second channel sounding bandwidth is larger than the first channel sounding bandwidth and the second power spectral density level is lower than the first transmit power spectral density level; and
        transmitting the second channel sounding burst having the second channel sounding bandwidth and the second power spectral density level.

2. The method of claim 1, further comprising:
    receiving a channel sounding burst schedule for the second channel sounding burst, wherein the channel sounding burst schedule is associated with the second channel sounding bandwidth.

3. The method of claim 1, wherein the channel sounding burst is a code division multiplexed signal.

4. The method of claim 1, wherein said receiving the power control target is performed periodically.

5. The method of claim 1, wherein the first channel sounding bandwidth is one resource block.

6. The method of claim 1, wherein the subscriber station is transmitting at maximum or near maximum power.

7. The method of claim 1, wherein the first channel sounding burst and the second channel sounding burst are generated by a cyclic shift of a constant amplitude zero autocorrelation (CAZAC) sequence and transmitted in a channel sounding symbol.

8. The method of claim 7, wherein one or more of the cyclic shifts of the CAZAC sequence is not assigned to a subscriber station within the second channel sounding bandwidth of the channel sounding symbol.

9. An apparatus for implementation in a subscriber station, comprising:
    at least one processor, configured to operate with wireless communication circuitry of the subscriber station to:
        receive a power control target, wherein the power control target corresponds to a first transmit power spectral density level for transmitting a first channel sounding burst having first channel sounding bandwidth;
        determine a second power spectral density level by scaling the first power control target based on a second channel sounding bandwidth for a second channel sounding burst, wherein the second channel sounding bandwidth is larger than the first channel sounding bandwidth and the second power spectral density level is lower than the first transmit power spectral density level; and
        transmit the second channel sounding burst having the second channel sounding bandwidth and the second power spectral density level.

10. The apparatus of claim 9, wherein the at least one processor is further configured to:
    receive a channel sounding burst schedule for the second channel sounding burst, wherein the channel sounding burst schedule is associated with the second channel sounding bandwidth.

11. The apparatus of claim 9, wherein the channel sounding burst is a code division multiplexed signal.

12. The apparatus of claim 9, wherein said receiving the power control target is performed periodically.

13. The apparatus of claim 9, wherein the first channel sounding bandwidth is one resource block.

14. The apparatus of claim 9, wherein the first channel sounding burst and the second channel sounding burst are generated by a cyclic shift of a constant amplitude zero autocorrelation (CAZAC) sequence and transmitted in a channel sounding symbol.

15. A subscriber station, comprising:
    wireless communication circuitry; and
    at least one processor coupled to the wireless communication circuitry, wherein the at least one processor is configured to operate with wireless communication circuitry of the subscriber station to:
        receive a power control target, wherein the power control target corresponds to a first transmit power spectral density level for transmitting a first channel sounding burst having first channel sounding bandwidth;
        determine a second power spectral density level by scaling the power control target based on a second channel sounding bandwidth for a second channel sounding burst, wherein the second channel sounding bandwidth is larger than the first channel sounding bandwidth and the second power spectral density level is lower than the first transmit power spectral density level; and
        transmit the second channel sounding burst having the second channel sounding bandwidth and the second power spectral density level.

16. The subscriber station of claim 15, wherein the at least one processor is further configured to:

receive a channel sounding burst schedule for the second channel sounding burst, wherein the channel sounding burst schedule is associated with the second channel sounding bandwidth.

17. The subscriber station of claim 15, wherein the channel sounding burst is a code division multiplexed signal.

18. The subscriber station of claim 15, wherein said receiving the power control target is performed periodically.

19. The subscriber station of claim 15, wherein the first channel sounding bandwidth is one resource block.

20. The subscriber station of claim 15, wherein the first channel sounding burst and the second channel sounding burst are generated by a cyclic shift of a constant amplitude zero autocorrelation (CAZAC) sequence and transmitted in a channel sounding symbol.

* * * * *